(12) United States Patent
Servant et al.

(10) Patent No.: US 12,351,294 B2
(45) Date of Patent: Jul. 8, 2025

(54) PROPELLER FOR AN AIRCRAFT TURBOMACHINE

(71) Applicant: SAFRAN AIRCRAFT ENGINES, Paris (FR)

(72) Inventors: Regis Eugene Henri Servant, Moissy-Cramayel (FR); Clement Cottet, Moissy-Cramayel (FR); Mathias Gautier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/690,255

(22) PCT Filed: Sep. 5, 2022

(86) PCT No.: PCT/FR2022/051664
§ 371 (c)(1),
(2) Date: Mar. 7, 2024

(87) PCT Pub. No.: WO2023/037063
PCT Pub. Date: Mar. 16, 2023

(65) Prior Publication Data
US 2024/0367775 A1 Nov. 7, 2024

(30) Foreign Application Priority Data
Sep. 13, 2021 (FR) ...................................... 2109565

(51) Int. Cl.
*B64C 11/06* (2006.01)
*B64C 11/32* (2006.01)

(52) U.S. Cl.
CPC .............. *B64C 11/06* (2013.01); *B64C 11/32* (2013.01)

(58) Field of Classification Search
CPC ......... B64C 11/06; B64C 11/30; B64C 11/20; B64C 11/04; F01D 17/16; F01D 17/162;
(Continued)

(56) References Cited

U.S. PATENT DOCUMENTS

| 1,806,385 | A | * | 5/1931 | Bramson | ................. B64C 11/06 416/133 |
| 4,427,458 | A | | 1/1984 | Hasegawa et al. | |

(Continued)

FOREIGN PATENT DOCUMENTS

| FR | 3017163 A1 | 8/2015 |
| FR | 3080322 A1 | 10/2019 |

OTHER PUBLICATIONS

International Search Report and Written Opinion received for PCT Patent Application No. PCT/FR2022/051664, mailed on Dec. 6, 2022, 18 pages (8 pages of English Translation and 10 pages of Original Document).

*Primary Examiner* — Courtney D Heinle
*Assistant Examiner* — Ryan C Clark
(74) *Attorney, Agent, or Firm* — WOMBLE BOND DICKINSON (US) LLP (57) ABSTRACT

A propeller for an aircraft turbomachine, the propeller having; a hub extending around a first axis including openings distributed around the first axis, each of the openings having a substantially radial orientation relative to the first axis and extending through the hub, a system for controlling the angular setting of a blade which is mounted in each of the openings, and bearings for guiding the control system, which are mounted in each of the openings, the guide bearings including two guide bearings, one of which includes two annular rows of angular contact coaxial balls having different diameters.

18 Claims, 7 Drawing Sheets

(58) Field of Classification Search
CPC .. F02C 9/20; F02C 9/22; F04D 27/002; F04D 29/263; F04D 29/323; F04D 29/34; F04D 29/36
USPC .......................................................... 416/147
See application file for complete search history.

(56) References Cited

U.S. PATENT DOCUMENTS

| | | | | |
|---|---|---|---|---|
| 4,521,158 | A * | 6/1985 | Fickelscher | F04D 29/36 415/129 |
| 5,427,458 | A * | 6/1995 | Sanchez | F16C 33/58 384/450 |
| 6,015,264 | A * | 1/2000 | Violette | B64C 11/20 416/207 |
| 9,751,616 | B1 * | 9/2017 | Stanescu | F04D 29/34 |
| 2006/0093486 | A1 | 5/2006 | Gaiani | |
| 2007/0041839 | A1 * | 2/2007 | Carvalho | B64C 11/06 416/204 R |
| 2010/0008779 | A1 * | 1/2010 | Carvalho | B64C 11/30 416/147 |
| 2013/0336796 | A1 * | 12/2013 | Carvalho | F16C 33/723 29/889 |
| 2016/0152319 | A1 * | 6/2016 | Sebald | F16C 33/664 416/219 R |
| 2017/0101171 | A1 * | 4/2017 | Lefort | B64C 11/04 |
| 2017/0274980 | A1 * | 9/2017 | Dejeu | B64C 11/32 |
| 2017/0283036 | A1 * | 10/2017 | Garassino | B64C 11/40 |
| 2017/0284205 | A1 * | 10/2017 | Dejeu | B64C 11/06 |
| 2018/0290728 | A1 * | 10/2018 | Violette | B64C 11/06 |
| 2019/0010957 | A1 * | 1/2019 | Belmonte | B64C 11/06 |
| 2019/0323357 | A1 * | 10/2019 | Courtier | B64C 11/30 |

* cited by examiner

PROPELLER FOR AN AIRCRAFT TURBOMACHINE

TECHNICAL FIELD OF THE INVENTION

The present invention relates to the field of the aircraft turbomachines and in particular to the propulsion propellers of these turbomachines which comprise variable pitch vanes.

TECHNICAL BACKGROUND

The prior art comprises in particular the documents FR-A1-3 017 163, FR-A1-3 080 322, US-A1-2013/336796, US-A1-2006/093486, U.S. Pat. Nos. 1,806,385, 4,427,458 and US-A1-2017/101171.

An aircraft turbomachine propeller can be ducted, as in the case of a fan for example, or unducted, as in the case of an open-rotor architecture for example.

A propeller comprises vanes which may be pitch variable. The turbomachine then comprises a mechanism allowing for changing the pitch angle of the vanes in order to adapt the thrust generated by the propeller to different phases of flight.

The design of a propeller vane involves several disciplines with generally conflicting objectives. It must allow optimal aerodynamic performance (i.e. provide a thrust while maximising the efficiency), guarantee a mechanical strength of the vane (i.e. withstand the mechanical constraints resulting from static and dynamic loadings) while limiting the mass and the acoustic signature. In particular, the improvement in the aerodynamic performance of the propeller tends towards an increase of the BPR (By Pass Ratio), which translates into an increase in its external diameter and therefore in the span of the vanes. However, the increase in the BPR goes hand in hand with a reduction in the FPF (Fan Pressure Ratio). Therefore, a pitch change system (variable pitch vane) is usually required to make the propeller operable throughout the flight domain.

There are several technologies for attaching a variable pitch propeller vane and several technologies for controlling the angular pitch of such a propeller vane.

A propeller generally comprises a hub which carries systems for controlling the angular pitch of its vanes. The hub has a generally annular or polygonal shape around a first axis, which is the longitudinal axis of the turbomachine, and comprises openings distributed around this first axis and in which the control systems are housed.

Each of these openings has a substantially radial orientation with respect to the first axis and receives a control system as well as bearings for guiding the control system around a second axis radial with respect to the first axis, and which is a pitch axis for the corresponding vane.

In the context of the present invention, the control system comprises a vane comprising a blade connected to a root, a bowl comprising an inner housing for receiving the root of the vane, and elements for attaching and securing the root of the vane against rotation with respect to the bowl.

The control system is housed in the opening in the hub and ball bearings are mounted around the root of the vane, between the ends of the bowl and the hub.

In certain configurations, the openings in the hub designed to receive the control systems are through-going in the radial direction so as to allow the propeller and, in particular, the guide bearings to be mounted in a particular kinematic arrangement.

According to this kinematics, a ball bearing is mounted around the root of the vane, between a radially internal end of the bowl and the hub, from inside the hub, and another ball bearing is mounted around the root of the vane, between a radially external end of the bowl and the hub, from outside the hub.

Mounting the inner ball bearing requires the bowl to move inside the opening of the hub, along the pitch axis of the vane, which is referred to as the "mounting stroke", and which has an impact on the integration of the vane root, and consequently on the hub ratio of the aerodynamic vein (ratio between the radius of the vein at the vane root and the radius of the vein at the vane tip). To optimise the engine performance, the hub ratio should be as low as possible. This mounting stroke must therefore also be as short as possible.

The outer guide bearing is generally configured to take up the moments applied to the control system during operation, and the inner guide bearing is generally configured to take up the centrifugal forces applied to the control system during operation. For these reasons, the radially inner guide bearing is generally oversized compared to the other guide bearing, i.e. it comprises balls which have a larger diameter than the diameter of the balls in the other guide bearing.

This configuration has its disadvantages. The larger the diameter of the balls, the greater the mounting stroke, and the longer the bowl must be to allow this mounting. Extending the length of the bowl is problematic because it increases its overall dimension and the weight of the control system and therefore the turbomachine.

In addition, the centrifugal forces applied to the propeller are very high during operation, in the order of several tens of tonnes for each vane. The sizing of the inner bearing (increase in diameter and number of balls) then results in bearing dimensions that cannot be integrated into the specified hub ratio. With a fixed number of vanes, the proximity between the inner bearings of two adjacent vanes means that they have to be moved away from the engine axle as their dimensions increase. This means oversizing all the elements around them, i.e. the entire vane root area and therefore the vein, which penalises the ration of the hub of the engine and therefore its performance. Moreover, the further the bearings are from the axis of the propeller, the greater the centrifugal forces, and the larger and bulky the bearings have to be.

There is therefore a need for a solution that would resolve some or all of the problems outlined above.

SUMMARY OF THE INVENTION

The invention relates to a propeller for an aircraft turbomachine, this propeller comprising;
- a hub extending around a first axis and comprising openings distributed around this first axis, each of these openings having a substantially radial orientation with respect to said first axis and passing through said hub,
- a system for controlling the angular pitch of a vane which is mounted in each of said openings, and
- guide bearings for guiding the control system mounted in each of said openings, said control system comprising:
- a vane comprising a blade connected to a root, the vane comprising a pitch axis substantially radial with respect to said first axis,
- a bowl extending around said pitch axis, the bowl comprising an inner housing for receiving the root of the vane, and
- elements for attaching and securing the root of the vane against rotation with respect to the bowl, said guide bearings comprising:

a first ball bearing which extends around said pitch axis and said root, between a radially external end of said bowl and said hub, and a second ball bearing which extends around said pitch axis and said root, between a radially internal end of said bowl and said hub, characterised in that said second ball bearing comprises two annular rows of balls which are coaxial and in angular contact, a first of these rows having a first diameter and a second of these rows having a second diameter smaller than said first diameter, at least one plane perpendicular to said pitch axis passing through the first and second rows of balls.

The invention thus proposes the use of a second bearing with two rows of balls rather than a single row of balls. This allows to reduce the diameter of the balls in the second bearing. Each ball in a single-row ball bearing can be replaced by a smaller ball in a double-row ball bearing. The reduction in the diameter of the balls is advantageous for allowing the control system to be mounted according to the kinematics described above and which will be described in detail below, without affecting the overall dimensions of this system.

Replacing one row of balls with two rows of coaxial balls may increase the axial dimension of the bearing. To take account of this problem, the invention proposes using rows of balls with angular contacts and bringing the rows of balls as close together as possible. To achieve this, the rows of balls have different diameters and are passed through by at least one plane perpendicular to the pitch axis of the vane. This means that the rows of balls are directly superimposed on each other, with a zero axial air gap along the pitch axis, or are embedded in each other along this axis, which allows to optimise the overall dimension of the system.

In conclusion, the invention allow to replace a single-row ball bearing with a double-row ball bearing without necessarily impacting the aforementioned mounting stroke and therefore the dimensions of the control system.

The propeller according to the invention may comprise one or more of the following characteristics, taken in isolation from each other, or in combination with each other:

the second row of balls is at least partially engaged in the first row of balls;

the second row of balls is interposed between the first row of balls and the first ball bearing;

the second bearing comprises an internal ring formed in one-part with said bowl and an external ring fitted and attached in the opening of the hub, each of these rings comprising a first raceway of the first row of balls and a second raceway of the second row of balls;

said external ring is mounted on an internal annular surface of the hub and rests axially on a cylindrical bearing surface of this hub, either directly or by means of an annular wedge;

said external ring of the second bearing is formed in one-part;

said bowl is generally diabolo-shaped and comprises an annular constriction between said ends;

each of the openings of the hub comprises an internal annular rim which is intended to be located at the level of said constriction and/or which carries said cylindrical bearing surface, this internal rim comprising an internal diameter which corresponds to the minimum internal diameter of said opening and which is greater than the maximum external diameter of said radially internal end of the bowl;

the maximum external diameter of said radially internal end of the bowl is less than or equal to the minimum internal diameter of said external ring;

the balls of said first and second rows of balls have identical diameters;

the balls of each of said first and second rows of balls are held by an annular cage which comprises an annular rim configured to be engaged by a mounting tool for mounting the row of balls;

the annular rim comprises an annular row of through openings;

said bowl comprises an annular wall comprising a radially internal end closed by a bottom wall, and a radially external end which is open and configured to allow the root of the vane to be mounted inside the bowl, the bottom wall comprising a recess having a non-circular cross-section and configured to receive a free end of complementary shape to said root so that the bowl is secured in rotation to the root about said axis.

The present invention also relates to a turbomachine, in particular for an aircraft, comprising at least one propeller as described above.

The present invention finally relates to a method for mounting a propeller as described above, in which it comprises the steps of:

a) inserting the bowl into the opening in the hub, radially from the outside inwards with respect to said first axis, b) mounting the first and second annular rows of balls of the second guide bearing between the radially internal end of the bowl and the hub, and c) mounting at least one portion of the first guide bearing between the radially external end of the bowl and the hub.

The method may comprise, prior to step a), shrink-fitting an external ring of the second guide bearing into the opening of the hub.

Advantageously, the rows of balls of the second guide bearing are mounted one after the other in step a), by means of a mounting tool which is brought into engagement with each of these rows.

Advantageously, an external ring of the first guide bearing is mounted in the opening of the hub before step a), then balls and an internal ring of this bearing are mounted between the radially external end of the bowl and the hub during step c).

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

Figure 1:
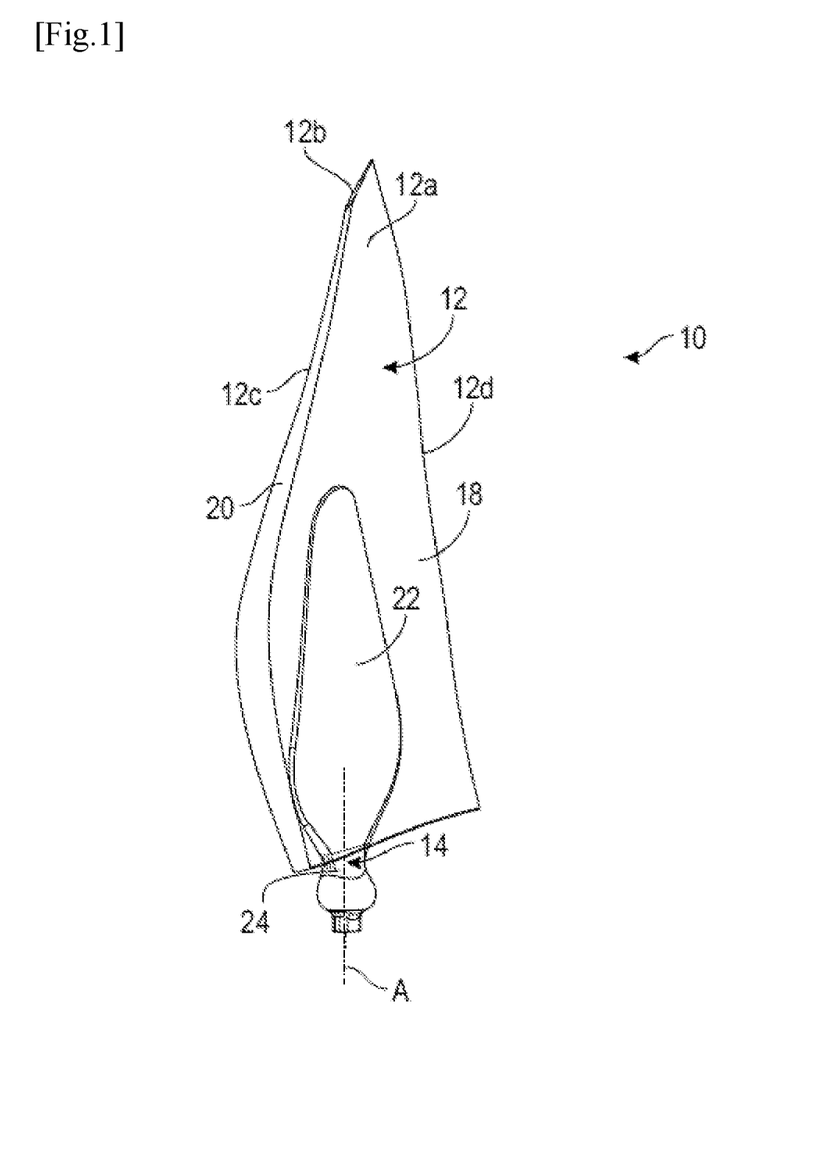
FIG. 1 is a schematic perspective view of a propeller vane for an aircraft turbomachine.

FIG. 1 shows a vane 10 for a propeller of an aircraft turbomachine, this propeller being either ducted or unducted.

The vane 10 comprises a blade 12 connected to a root 14.

The blade 12 has an aerodynamic profile and comprises a pressure side 12a and a suction side 12b which are connected by an upstream leading edge 12c and by a downstream trailing edge 12d, the terms upstream and downstream referring to the gas flow around the blade in operation.

The blade 12 has an upper end which is free, referred to as top, and a lower end which is connected to the root 14.

In the example shown, the vane 10 is made of a composite material by an injection method referred to as RTM method (Resin Transfer Molding). This method consists of preparing a fibrous preform 18 by three-dimensional weaving, then placing this preform in a mould and injecting a polymerizable resin, such as an epoxy resin, which will impregnate the preform. After the blade 12 has polymerized and hardened, its leading edge 12c is usually reinforced by a metallic shield 20 which is fitted and attached, for example by gluing.

The vane 10 here comprises a spar 22 which comprises a portion forming a web of the blade 12 and which is intended to be inserted into the preform 18 prior to the resin injection, and a portion which extends from the side opposite the top of the blade 14 to form a portion of the root 14, referred to as body 24.

The spar 22 is preferably made of a 3D woven carbon fibre reinforced epoxy organic matrix composite material with the warp direction predominantly radial oriented and the weft predominantly oriented along the chord of the blade at aerodynamic vein height. However, the spar can also be a more mechanically advantageous assembly of different organic matrix composite materials (thermoset, thermoplastic or elastomer) reinforced with long fibres (carbon, glass, aramid, polypropylene) in different fibrous arrangements (woven, braided, knitted, unidirectional).

Although not shown, the blade 12 may be hollow or solid and comprises an internal cavity filled with a foam or honeycomb type filler material. This filler material is installed around the spar 22 and is covered with a skin of organic matrix composite material to increase the impact resistance of the blade.

The shield 20 may be titanium or titanium alloy, stainless steel, steel, aluminium, nickel, etc. The pressure side 12a or even the suction side 12b of the blade 12 may be covered with a polyurethane film for the protection against erosion.

A is the axis of elongation of the vane 10 and of the blade 12 and in particular the pitch axis for setting the pitch of the vane 10, i.e. the axis about which the angular position of the vane is adjusted. In general, it is also a radial axis which extends along a radius in relation to the axis of rotation of the propeller equipped with this vane (which is referred to as the first axis and is not visible in the drawings).

Figure 2:
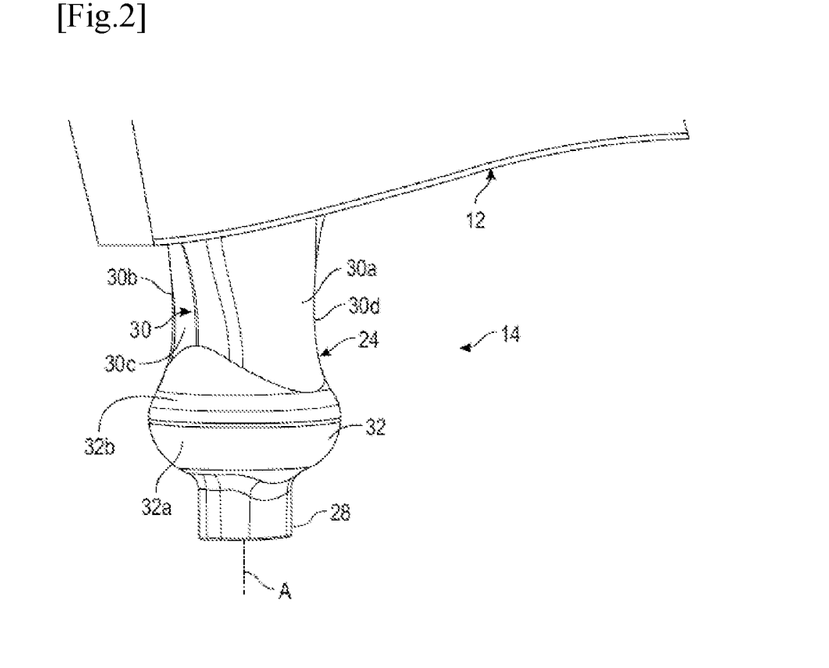
FIG. 2 is a larger scale view of a portion of FIG. 1 and shows the root of the vane.
Figure 3:
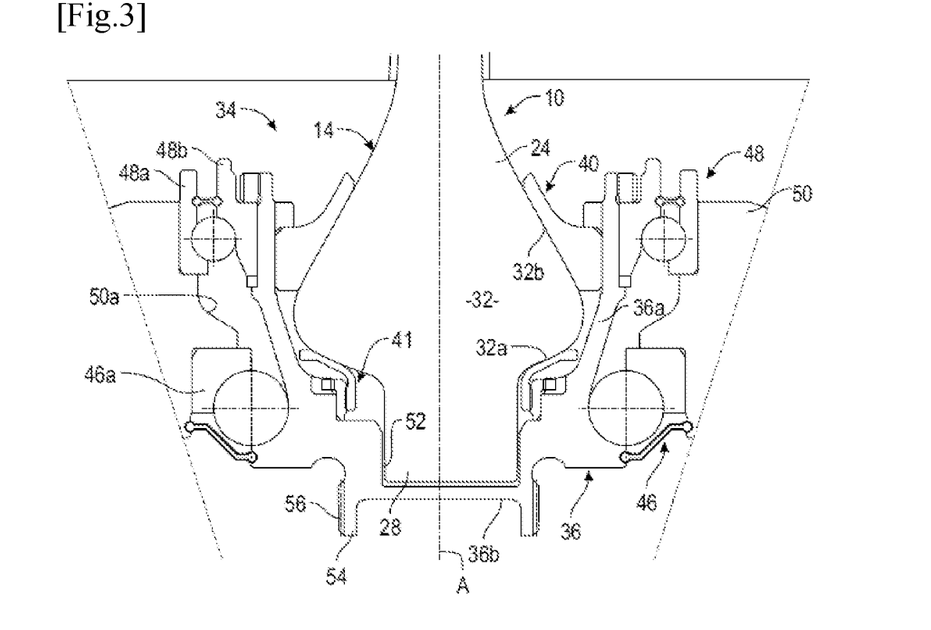
FIG. 3 is a schematic cross-sectional view of a propeller and an angular pitch system for setting the pitch of a vane of this propeller.

The body 24 of the root 14 has a particular shape that is best seen in FIGS. 2 and 3.

The body 24 essentially comprises three portions:
a free end 28 located on the opposite side to the blade 12,
a stilt 30 on the side of the blade 12, and
a bulb 32 located between the free end 28 and the stilt 30.

The free end 28 has a generally parallelepiped shape in the example shown. This end 28 is preferably misaligned or offset with respect to the axis A to provide keying or indexing.

The stilt 30 may have a relatively complex shape and may be considered to comprise:
two lateral flanks 30a, 30b, located respectively on the pressure side 12a and on the suction side 12b of the blade 12, which converge towards each other along the axis A and in the direction of the top of the blade 12, and
two edges, respectively upstream 30c and downstream 30d, which diverge from each other along the axis A and towards the top of the blade 12.

The bulb 32 has a generally bulged or domed shape, this bulging or doming extending around the axis A.

The bulb 32 has two peripheral bearing surfaces, lower 32a and upper 32b respectively, which extend around the axis A. In the example shown, because of the shape of the bulb, the lower bearing surface 32a faces downwards (i.e. away from the blade 12), radially outwards with respect to the axis A and radially inwards with respect to the first axis of the propeller, and the upper bearing surface 32b faces upwards (i.e. towards the blade 12), radially outwards with respect to the axis A and radially outwards with respect to the first axis of the propeller.

FIG. 3 illustrates a system 34 for setting the angular pitch of a vane 10 as shown in FIGS. 1 and 2.

The system 34 essentially comprises the vane 10, a bowl 36, and elements 40, 41 for attaching and securing in rotation the root 14 of the vane 10 with respect to the bowl 36.

The bowl 36 comprises an annular wall 36a extending around the axis A. This wall 36a comprises a radially internal axial end with respect to the first axis, which is closed by a bottom wall 36b, and a radially external axial end which is open and configured to allow the root 14 of the vane 10 to be mounted inside the bowl 36. It is assumed here that the axis A of the bowl 36 is that of the vane 10 and corresponds to the axis of rotation for the change in angular pitch of the vane 10, this axis A being substantially radial with respect to the first axis of the propeller.

The bottom wall 36b is designed to cooperate in a form-fitting manner with the free end of the root 14, and therefore with the end 28 of the body 24, so that the bowl 36 is secured against rotation to the root 14 about the axis A.

In the present case, it is understood that the bottom wall 36b comprises a recess 52 having a non-circular, and in particular rectangular, cross-section and configured to receive the end 28 (FIG. 3). This recess 52 is preferably eccentric with respect to the axis A in the same way as the end 28. This eccentricity allows an indexing and a keying when inserting and mounting the root 14 into the bowl 36, with only one engagement position of the end 28 in the recess 52 being possible.

The recess 52 is located on an upper or internal face of the bottom wall 36*b* of the bowl 36, which is therefore located inside the bowl 36 and facing the side of the root 14.

The system 34 generates a torque at the vane root 14 which counteracts the torsional moment resulting from aerodynamic and centrifugal forces. The transmission of forces between the bowl 36 and the root 12 is direct, the torsional moment being applied directly to the body 24 of the root 14.

The bottom wall 36*b* comprises a lower or external face, which is located on the side opposite the root 14, and which comprises a cylindrical extension 54 extending along the axis A and comprising an external thread or external rectilinear splines 56 for rotational coupling of the system with a pitch change mechanism which is not illustrated and which is common to the various systems 34 of the propeller.

A first annular attachment element 41 is mounted inside the bowl 36, close to its bottom wall 36*b*. This first element 41 extends around the axis A and is interposed axially (with respect to the axis A) between the bowl 36 and the root 14 of the vane 10. This first element 41 is attached or secured to the bowl 36 by appropriate means and rests on the lower bearing surface 32*a* of the root 14, all around the axis A. This first element 41 can be configured to preload the root 14 of the vane 10 inside the bowl, along the axis A.

A second annular attachment element 40 is mounted inside the bowl 36, close to its radially external end. This second element 40 extends around the axis A and is interposed radially (with respect to the axis A) between the bowl 36 and the root 14 of the vane 10. This second element 40 is attached or secured to the bowl 36 by appropriate means and rests on the upper bearing surface 32*b* of the root 14, all around the axis A. This second element 40 can be sectorised to allow it to be mounted around the root 14. This second element 40 can be configured to retain the root 14 of the vane 10 inside the bowl, along the axis A.

Guide bearings 46, 48 are mounted around the bowl 36, between the bowl 36 and a hub 50 of the propeller. Although not visible in the drawings, the hub 50 extends around the axis of rotation of the propeller (first axis) and may have a generally annular or polygonal shape.

The hub 50 comprises openings 50*a* for mounting the control systems 34 on the vanes 10. The openings 50*a* are distributed around the first axis and pass through in the radial direction as shown in FIG. 3, i.e. they open onto the internal and external peripheral faces of the hub 50.

The bearings 46, 48 are two in number and are respectively a radially internal bearing 46 and a radially external bearing 48.

The bearings 46, 48 are of the rolling bearing with balls. In the example shown, they have different diameters and their balls also have different diameters. The bearings 46, 48 are angular contact.

The bearing 46 extends substantially around the lower bearing surface 32*a* and/or the free end 28 of the root 14. This bearing 46 has a smaller diameter than the other bearing 48, and theirs balls have a larger diameter than those of the other bearing 48.

The hub 50 carries the external rings 46*a*, 48*a* of the bearings 46, 48 and their internal rings 48*b* are carried by the bowl 36 or integrated into the latter, as is the case with the internal ring of the bearing 46 in the example shown.

The bearings 46, 48 ensure that the bowl 36 is centered and guided around the axis A in relation to the hub 50. The bowl 36 therefore acts as a pivot for the vane 10, relative to the hub 50.

Figure 4:
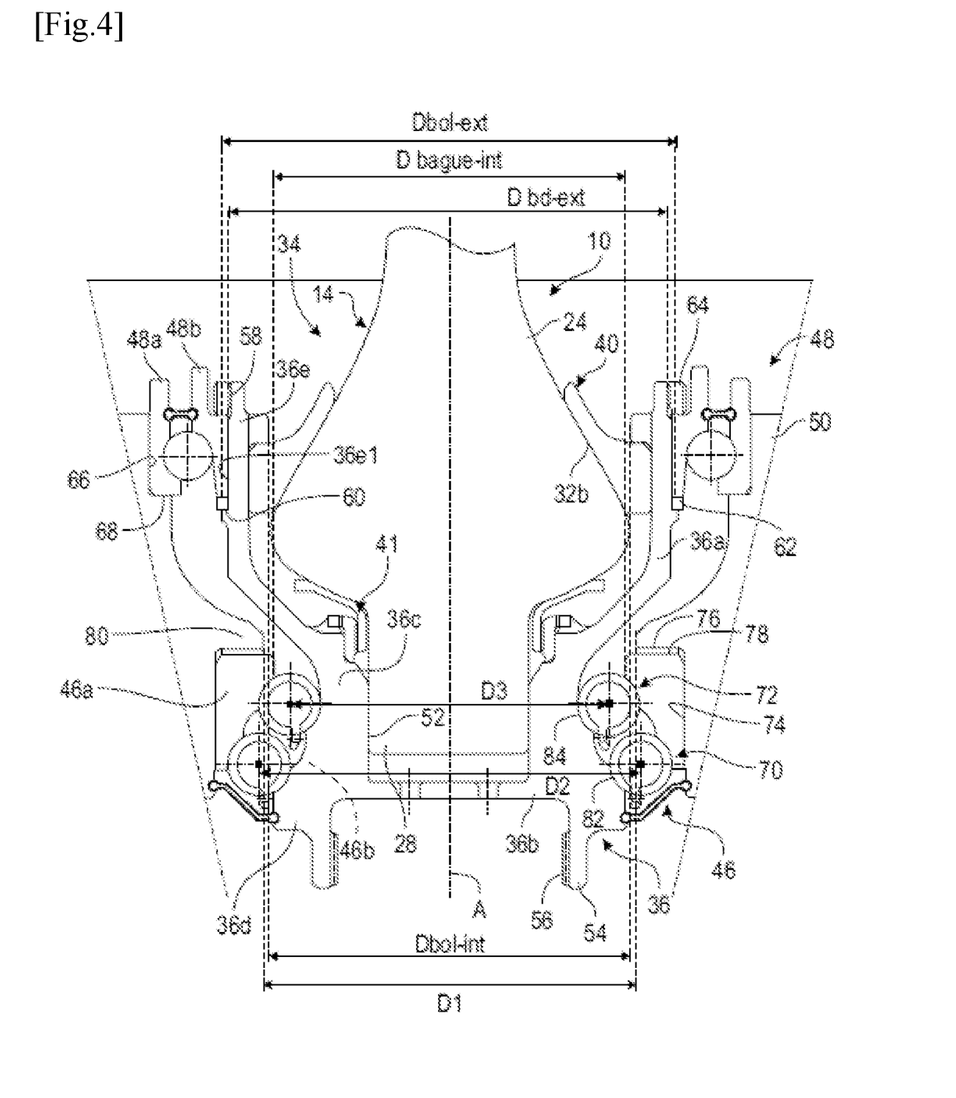
FIG. 4 is a schematic cross-sectional view of a propeller and a system for angularly setting the pitch of a vane of this propeller, according to one embodiment of the present invention.

The present invention provides an improvement to the technology described above, one embodiment of this improvement is illustrated in FIG. 4.

The vane 10 is similar to that described above in relation to FIGS. 1 to 3.

The attachment elements 40, 41 for the root 14 of the vane 10 in the bowl 36 are similar to those described in relation to FIG. 3. This is just one non-limiting example of embodiment of these attachment elements 40, 41. Other variants are conceivable but will not be described as they do not directly concern the invention.

The bowl 36 is similar to that described above in relation to FIG. 3. The bowl 36 may be generally diabolo-shaped as it comprises an annular constriction 36*c* between its radially internal 36*d* and external 36*e* ends.

The radially external end 36*e* of the bowl 36 comprises an external cylindrical surface 36*e*1 which extends between an external thread 58 located on the blade 12 side of the vane 10, and a cylindrical bearing surface 60 located on the opposite side.

The radially external guide bearing 48 comprises a row of balls interposed between two rings 48*a*, 48*b*. The internal ring 48*b* is mounted on the surface 36*e*1, preferably sliding on this surface 36*e*1. It rests axially, directly or by means of an annular wedge 62, on the bearing surface 60, and is clamped axially against this bearing surface by a nut 64 screwed onto the thread 58.

The external ring 48*a* of the bearing 48 is mounted on an internal cylindrical surface 66 of the hub 50, and preferably shrunk onto this surface 66. This surface 66 is located at a radially external end of the opening 50*a*. The ring 48*a* rests axially on a cylindrical bearing surface 68 of the hub 50 located at the radially internal end of the surface 66, either directly or by means of an annular wedge.

Each of the rings 48*a*, 48*b* of the bearing 48 comprises a raceway for the row of balls. The bearing 48 is with angular contact. In the example shown, the bearing points or surfaces of the balls on the raceways of the rings 48*a*, 48*b* are located on a frustoconical surface which extends along the axis A and whose largest diameter is located on the side of the free end 28 of the root 14 of the vane 10.

The radially internal guide bearing 46 comprises two rows of balls 70, 72. The external ring 46*a* of the bearing 46 is mounted on an internal cylindrical surface 74 of the hub 50, and preferably shrunk onto this surface 74. This surface 74 is located at a radially internal end of the opening 50*a*. The ring 46*a* rests axially on a cylindrical bearing surface 76 of the hub 50 located at the radially external end of the surface 74, either directly or by means of an annular wedge 78. The internal ring 46*b* of the bearing 46 comprises two raceways for the two rows of balls 70, 72 respectively.

In the example shown, the bearing surface 76 is formed by an internal annular rim 80 of the hub 50, which extends inside the opening 50*a* substantially at the level of the constriction 36*c* of the bowl 36.

This rim 80 has a minimum internal diameter which defines the minimum internal diameter of the opening 50*a* and which is denoted D1.

The internal ring 46*b* of the bearing 46 is preferably integrated into the bowl 36, i.e. formed in one-part with the bowl 36. The radially internal end 36*d* of the bowl 36 thus comprises two raceways 82, 84 for the rows of balls 70, 72 at its external periphery.

The rows of balls 70, 72 in the bearing 46 have different diameters D2, D3. In the example shown, the row of balls 72 of smaller diameter D3 is interposed axially (with respect to the axis A) between the row of balls 70 of larger diameter D2 and the bearing 48.

This means that the raceway 84 of the row of balls 72 with a diameter D3 has a smaller diameter than the raceway 82 of the row of balls 70 with a diameter D2. The row of balls 72 of diameter D3 is located at or near the constriction 36c of the bowl 36 and it is understood that the radially internal end 36d of the bowl 36 has a diameter which increases towards the axis of the propeller from the constriction 36c, contributing to the aforementioned particular diabolo shape.

The two rows of balls 70, 72 in the bearing 46 are angular contact. In the example shown, the bearing points or surfaces of the balls on each of the raceways 82, 84 are located on a frustoconical surface which extends along the axis A and whose largest diameter is located on the side of the top of the vane 10.

Figure 4A:
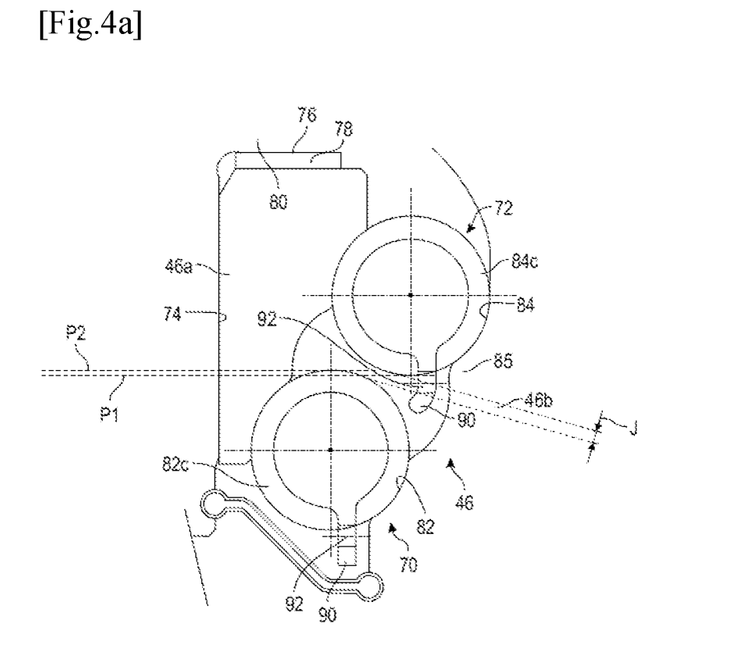
FIG. 4a is a larger scale view of a detail in FIG. 4.
Figure 5:
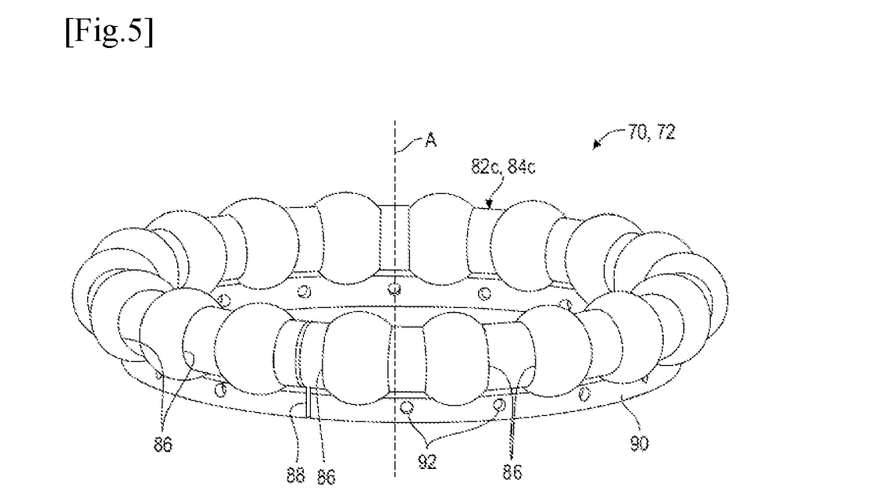
FIG. 5 is a schematic perspective view of a row of balls in a guide bearing of the propeller in FIG. 4.

FIG. 4a is a larger scale view of the rows of balls 70, 72 and FIG. 5 shows a cage 82C, 84C of these rows of balls 70, 72. The balls in the two rows 70, 72 preferably have the same diameter. The number of balls in the row of balls 70 may be greater than or equal to the number of balls in the row of balls 72.

FIG. 4a shows that at least one plane P1, P2 perpendicular to the pitch axis A passes through the two rows of balls 70, 72. When the facing ends of the two rows of balls 70, 72 are located in the same transverse plane, the rows of balls are considered to be stacked directly on top of each other. When the rows of balls are axially engaged one inside the other (i.e. nested one inside the other), they are passed through by several planes P1, P2, as illustrated in the drawing where the row of balls 72 is partially engaged inside the row of balls 70. However, the rows of balls 70, 72 remain spaced apart by a predetermined clearance J or air gap, thanks to the angular contacts and their different diameters.

The cage 82C, 84C in each row 70, 72 is configured to hold the balls at regular intervals from each other. The cage 82C, 84C is generally tubular in cross-section and comprises a plurality of notches 86 in each of which a ball is housed. The cage 82C, 84C is slotted and comprises a through slot 88 allowing the diameter of the cage 82C, 84C and the row of balls 70, 72 to be increased during its assembly. Furthermore, in the example shown, the cage 82C, 84C comprises an annular rim 90 which extends around the axis A, for example. This rim 90 is configured to cooperate with a mounting tool for each row of balls 70, 72. This rim 90 comprises an annular row of openings 92 passing through in the radial direction with respect to the axis A. The tool comprises, for example, claws designed to be engaged in these openings 92.

FIG. 4a also shows that the rims 90 of the two rows of balls 70, 72 are not necessarily identical. The rim 90 of the row of balls 70 is generally cylindrical in shape and extends towards the axle of the propeller in the mounted position. The rim 90 of the row of balls 72 is generally frustoconical or bent in cross-section and also extends towards the axle of the propeller in the mounted position. The shapes of the rims are designed to avoid any interaction with the rings 46a, 46b of the bearing 46 during operation. It is understood that the shape of the rim 90 of the row of balls 72 allows to prevent an interaction with the internal ring 46b and the bowl 36.

We define by:
Dbol_ext the external diameter of the radially external end 36e of the bowl 36, this diameter may be defined by the external periphery of the shoulder 60, for example,
Dbol_int the external diameter of the radially internal end 36d of the bowl 36,
Dbague_ext the internal diameter of the internal ring 48b of the bearing 48, and
Dbague_int the internal diameter of the external ring 46a of the bearing 46.

FIG. 4 allows to show that:
Dbague_ext is greater than D1; this implies that the bearing 48 and in particular its internal ring 48b must be mounted in the opening 50a of the hub 50 radially from the outside; the external ring 48a of the bearing 48 is also mounted in the opening 50a of the hub 50 radially from the outside; the external ring 46b of the bearing 46 is mounted in the opening 50a of the hub 50 radially from the inside;
Dbague_int may be less than or equal to D1; as can be seen in the drawings, this allows the external ring 46b of the bearing 46 to project inside the opening 50a with respect to the rim 80; this is advantageous for facilitating the removal of the ring 46b by means of an extraction tool during a maintenance operation; similarly, as illustrated, the external ring 48b of the bearing 48 may project inside the opening 50a to facilitate its extraction by means of a tool;
Dbol_ext is greater than D1 and Dbol_int is less than D1 and less than or equal to Dbague_int; this implies that the bowl 36 is mounted in the opening 50a of the hub 50 radially from the outside by engaging the radially internal end 36d of the bowl 36 through the rim 80 of this opening 50a; this also implies that, during assembly, the bowl is able to come to rest axially on the rim 80 of the hub 50; after the mounting, this abutment is removed to avoid any interaction and friction between the bowl and the hub during operation.

The present invention also relates to a method for mounting a system 34 as described in the foregoing, which comprises the steps of:
a) inserting the bowl 36 into the opening 50a of the hub 50, radially from the outside inwards along the axis A,
b) mounting the rows of balls 70, 72 of the guide bearing 46 between the radially internal end 36d of the bowl 36 and the hub 50, and
c) mounting at least a portion of the guide bearing 48 between the radially external end 36e of the bowl 36 and the hub 50.

Figure 6:
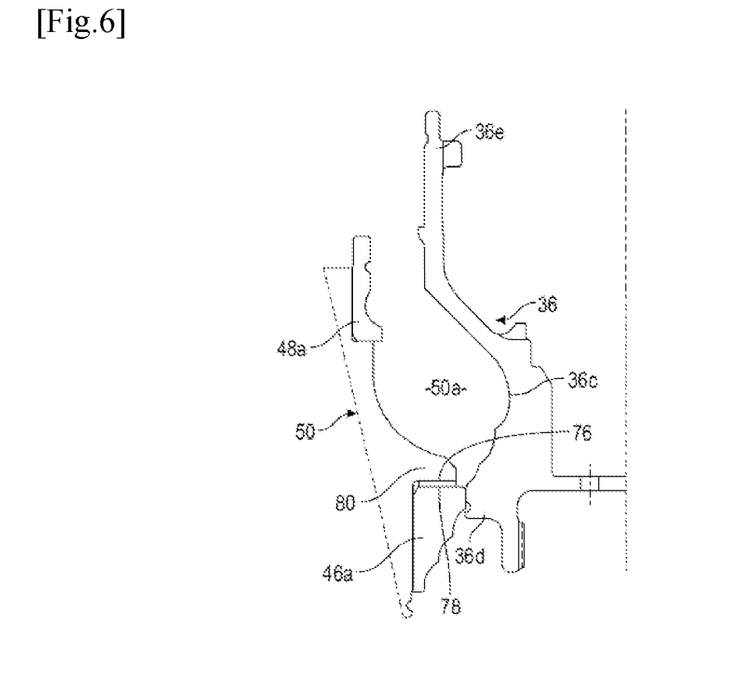
FIG. 6 is a partial schematic cross-sectional view of the hub and of a bowl of the control system in FIG. 4, and illustrates a step in a method for mounting the propeller.

The step a) is illustrated in FIG. 6. Prior to this step, as illustrated, the method may comprise shrink-fitting the external ring 46a of the guide bearing 46 into the opening 50a of the hub 50. The wedge 78 can be interposed between the external ring 46a and the bearing surface 76 to adjust the positioning of the bowl along the axis A, in order to optimise the positioning of the vane and minimise the need to balance the propeller. Prior to step a), as illustrated, the method may also comprise the shrink-fitting of the external ring 48a of the guide bearing 48 into the opening 50a of the hub 50.

During step a), the bowl 36 is moved into the opening 50a, radially from the outside inwards, so that the radially internal end 36d of the bowl 36 is radially inside the external ring 46a of the bearing 46.

Figure 7:
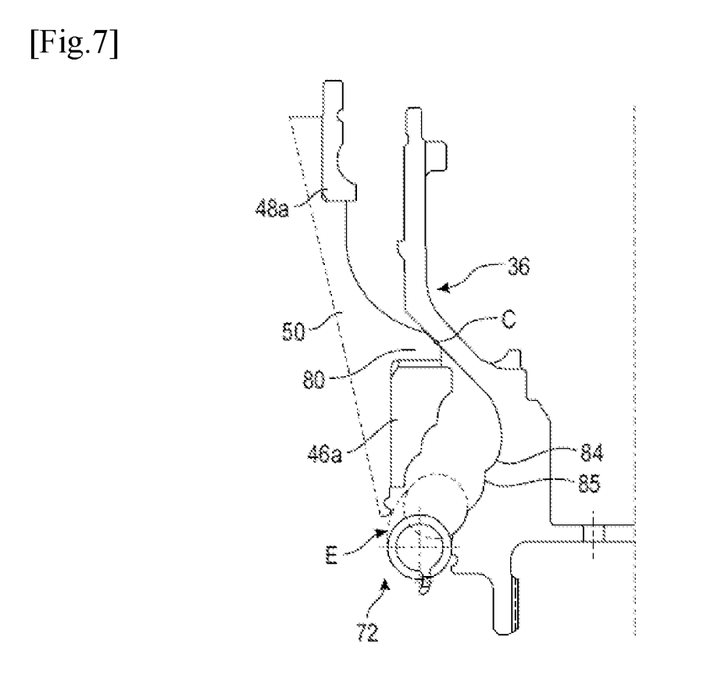
FIG. 7 is a similar view to FIG. 6 and illustrates another step in the method.

This leads to the configuration shown in FIG. 7, in which the bowl 36 can come to rest axially (relative to the axis A) at C on the internal rim 80 of the opening 50a.

Figure 8:
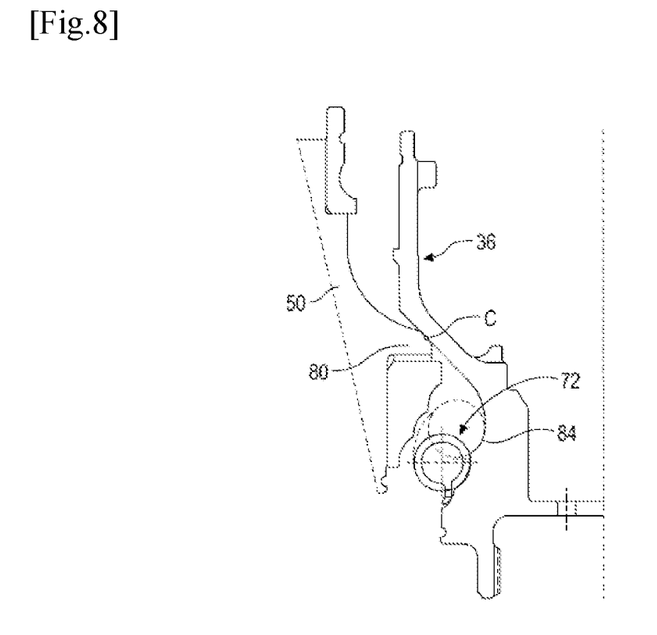
FIG. 8 is a similar view to FIG. 6 and illustrates another step in the method.

The annular space E between the radially internal end of the opening 50a and the radially internal end 36d of the bowl 36 is sufficient to allow the row of balls 72 of diameter D3 to be mounted by means of the aforementioned tool in engagement with the rim 90 of the cage 84C of this row. To do this, the diameter of the row 72 has to be enlarged and the row 72 is inserted around the bowl 36 and moved radially from the inside outwards until it is mounted at the level of the raceway 84 (FIGS. 7 and 8).

The row of balls 72 is first mounted at the level of the raceway 82.

Advantageously, the raceways 82, 84 are separated from each other by an annular rib 85 visible in FIG. 4a. This rib 85 prevents the row of balls 72 from going directly onto its raceway 84. The operator performing the mounting has to exert a pushing force on the row of balls to pass this rib 85, and move the row of balls from the raceway 82 to the raceway 84.

The rib 85 is particularly useful during dismounting, so that the operator can feel where the row of balls is located when he blindly pulls on this row of balls to extract it, and prevents it from unintentionally returning towards the raceway 84.

The top of this rib 85 is preferably radiused so as not to damage the row of balls 72 during mounting/dismounting. This is also preferably the case for the annular ridges of the external ring 46a of the bearing 46.

Figure 9:
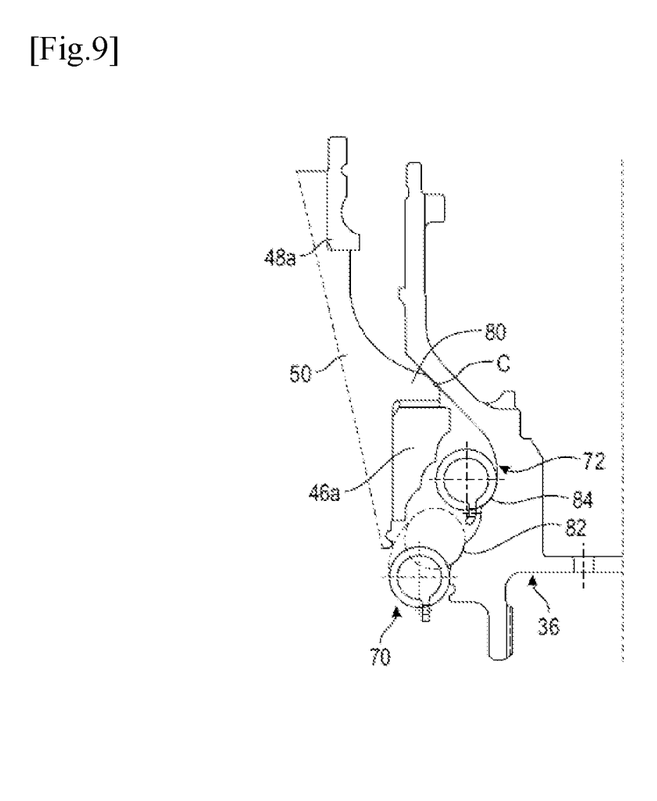
FIG. 9 is a similar view to FIG. 6 and illustrates another step in the method.

The row of balls 70 of diameter D2 is mounted in the same way at the level of the raceway 82, through the same space E (FIG. 9).

The bowl 36 can then be moved along the axis A from the inside outwards so that the rows of balls 70, 72 are housed in the raceways of the external ring 46a of the bearing 46.

Figure 10:
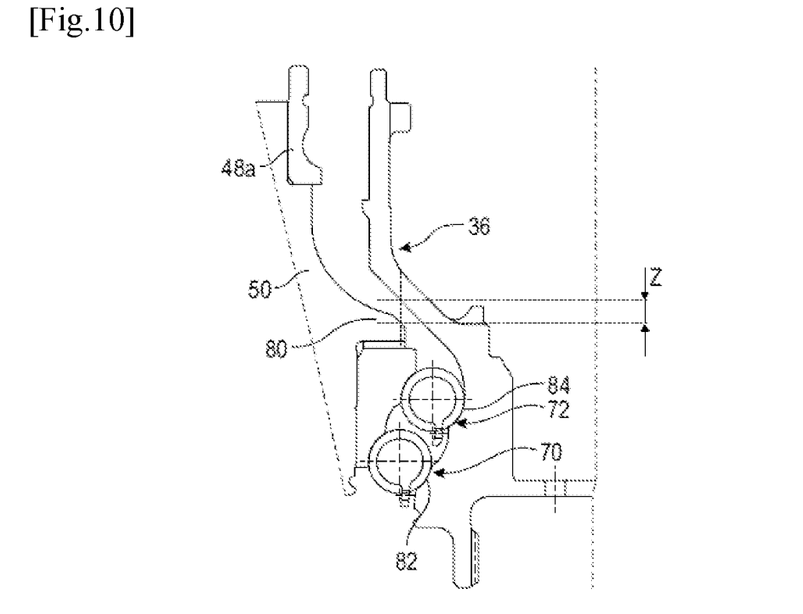
FIG. 10 is a similar view to FIG. 6 and illustrates a further step in the method.

In this position, illustrated in FIG. 10, the bowl 36 is axially spaced from the annular rim 80 of the hub 50. This axial spacing Z represents the "mounting stroke" of the bowl 36, along the axis A, which allows the rows of balls 70, 72 to be mounted from the inside of the hub 50 (see FIG. 10).

The mounting of the rows of balls 70, 72 in the bearing 46 represents step b).

Figure 11:
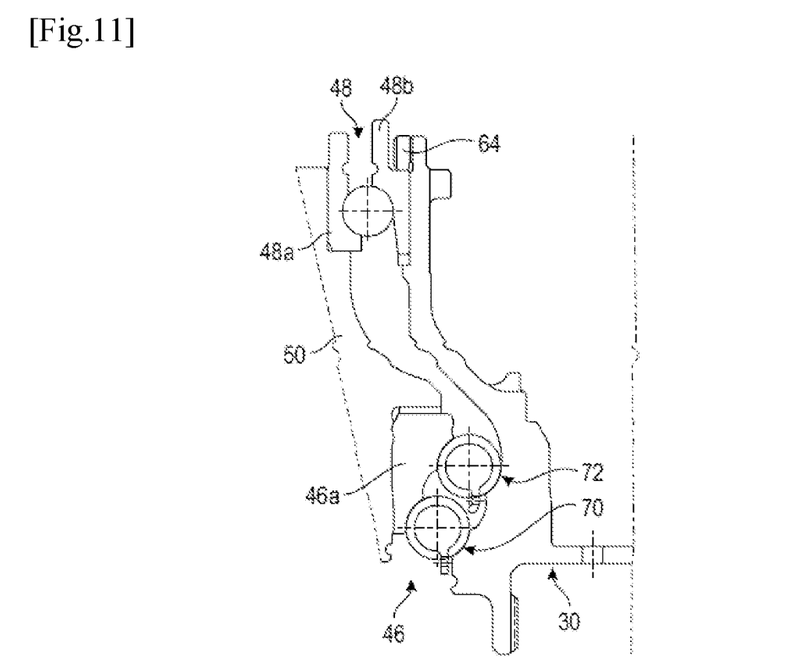
FIG. 11 is a similar view to FIG. 6 and illustrates another step in the method.

The method then comprises step c) mounting the rest of the bearing 48 as shown in FIG. 11.

The invention allows the single-row ball bearing to be replaced by a double-row ball bearing with a similar load capacity. As mentioned above, mounting the double-row ball bearing requires a mounting stroke that can be equivalent to the mounting stroke of the single-row ball bearing. The mounting stroke can therefore be maintained despite the fact that the bearing may have a greater height or axial dimension due to the superposition of the two rows of balls. This ultimately limits the impact of the bearing on the hub ratio of the propeller.

Other advantages of the present invention comprise:
the load capacity of the inner bearing can be increased (by increasing the number of balls, for example) without increasing its diameter,
the mounting kinematics can be maintained despite the installation of a double-row ball bearing,
the mounting remains relatively simple, essentially based on a sequence of relative positioning of the parts,
no need to heat the parts when mounting the bowl in the opening of the hub, the external ring of the inner double-row ball bearing is single part and can be shrunk into the opening of the hub before the rows of balls are mounted,
As this external ring is single part, there is not necessarily any need for the additional setting wedge that would be required if it were conventionally in two portions, to ensure that the two rows of balls are correctly positioned and both rest on the two portions of the external ring,
the bowl and the bearings can form an assembly supplied directly by the bearing manufacturer, in order to better control the geometric tolerances required for the correct operation of this assembly.

The invention claimed is:

1. A propeller for an aircraft turbomachine, this propeller comprising:
   a hub extending around a first axis and comprising openings distributed around this first axis, each of these openings having a radial orientation with respect to said first axis and passing through said hub,
   a control system for controlling an angular pitch of a vane which is mounted in each of said openings, and
   guide bearings for guiding the control system, which are mounted in each of said openings,
   said control system comprising:
   a vane comprising a blade connected to a root, the vane comprising a pitch axis which is radial with respect to said first axis,
   a bowl extending around said pitch axis, the bowl comprising an inner housing for receiving the root of the vane, and
   elements for attaching and securing the root of the vane against rotation with respect to the bowl,
   said guide bearings comprising:
   a first ball bearing extending around said pitch axis and said root, between a radially external end of said bowl and said hub, and
   a second ball bearing which extends around said pitch axis and said root, between a radially internal end of said bowl and said hub,
   wherein said second ball bearing comprises two annular rows of balls which are coaxial and with angular contact, a first of these rows having a first diameter and a second of these rows having a second diameter smaller than the first diameter, at least one plane perpendicular to said pitch axis passing through the first and second rows of balls.

2. The propeller according to claim 1, wherein the second row of balls is at least partially engaged in the first row of balls.

3. The propeller as claimed in claim 1, wherein the second row of balls is interposed between the first row of balls and the first ball bearing.

4. The propeller according to claim 1, wherein the second bearing comprises an internal ring formed in one-part with said bowl and an external ring fitted and attached in the opening of the hub, each of these rings comprising a first raceway of the first row of balls and a second raceway of the second row of balls.

5. The propeller according to claim 4, wherein said external ring is mounted on an internal annular surface of the hub and rests axially on a cylindrical bearing surface of this hub, directly or by means of an annular wedge.

6. The propeller according to claim 5, wherein said external ring is formed in one-part.

7. The propeller according to claim 1, wherein said bowl is diabolo-shaped and comprises an annular constriction between said ends.

8. The propeller according to claim 7, wherein each of the openings of the hub comprises an internal annular rim which is located at the level of said annular constriction and/or which carries said cylindrical bearing surface, the internal annular rim comprising an internal diameter which corresponds to a minimum internal diameter of said opening and which is greater than a maximum external diameter of said radially internal end of the bowl.

9. The propeller according to claim 5, wherein a maximum external diameter of said radially internal end of the bowl is less than or equal to a minimum internal diameter of said external ring.

10. The propeller according to claim 1, wherein the balls of said first and second rows of balls have identical diameters.

11. The propeller according to claim 1, wherein the balls of each of said first and second rows of balls are held by an annular cage which comprises an annular rim configured to be engaged by a ball row mounting tool.

12. The propeller according to claim 11, wherein the annular rim comprises an annular row of through openings.

13. The propeller according to claim 1, wherein said bowl comprises an annular wall comprising a radially internal end closed by a bottom wall, and a radially external end open and configured to allow mounting the root of the vane within the bowl, the bottom wall comprising a recess having a non-circular cross-section and configured to receive a free end of complementary shape to said root so that the bowl is secured in rotation to the root about said axis.

14. A turbomachine, in particular for an aircraft, comprising at least one propeller according to claim 1.

15. A method for mounting a propeller according to claim 1, wherein it comprises the steps of:
  a) inserting the bowl into the opening of the hub, radially from the outside towards the inside with respect to said first axis,
  b) mounting the first and second annular rows of balls of the second guide bearing between the radially internal end of the bowl and the hub, and
  c) mounting at least one portion of the first guide bearing between the radially external end of the bowl and the hub.

16. The method according to claim 15, wherein it comprises, prior to step a), shrink-fitting an external ring of the second guide bearing into the opening of the hub.

17. The method according to claim 15, wherein the rows of balls of the second guide bearing are mounted one after the other in step a), by means of a mounting tool which is brought into engagement with each of these rows.

18. The method according to claim 15, wherein an external ring of the first guide bearing is mounted in the opening of the hub before step a) and then balls and an internal ring of the first guide bearing are mounted between the radially external end of the bowl and the hub in step c).

* * * * *